(12) United States Patent
Kim et al.

(10) Patent No.: US 11,528,544 B2
(45) Date of Patent: Dec. 13, 2022

(54) DISPLAY DEVICE

(71) Applicant: Samsung Display Co., Ltd., Yongin-Si (KR)

(72) Inventors: Tae-Sung Kim, Bucheon-si (KR); Youngji Kim, Jeju-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 17/308,468

(22) Filed: May 5, 2021

(65) Prior Publication Data
US 2022/0046349 A1 Feb. 10, 2022

(30) Foreign Application Priority Data
Aug. 6, 2020 (KR) .................. 10-2020-0098599

(51) Int. Cl.
H04R 25/00 (2006.01)
H04R 1/02 (2006.01)
H04N 5/64 (2006.01)

(52) U.S. Cl.
CPC ............ H04R 1/028 (2013.01); H04N 5/642 (2013.01)

(58) Field of Classification Search
CPC ................................ H04R 1/028; H04N 5/642
See application file for complete search history.

(56) References Cited

U.S. PATENT DOCUMENTS

| 10,416,707 | B2 | 9/2019 | Choi et al. |
| 10,567,880 | B2 | 2/2020 | Ham et al. |
| 2017/0280243 | A1* | 9/2017 | Choi ........................ H04R 9/06 |
| 2018/0317011 | A1* | 11/2018 | Choi ........................ H04R 7/04 |
| 2018/0332376 | A1* | 11/2018 | Lee ......................... H04R 7/045 |
| 2019/0018448 | A1* | 1/2019 | Lee ................... G02F 1/136286 |
| 2019/0028787 | A1 | 1/2019 | Masuda et al. |
| 2019/0037165 | A1* | 1/2019 | Lee ...................... H01L 27/3225 |
| 2019/0045287 | A1* | 2/2019 | Lee ......................... H04R 9/025 |
| 2019/0079556 | A1* | 3/2019 | Choi ........................ H04R 5/02 |
| 2019/0098411 | A1* | 3/2019 | Ham ........................ H04R 7/045 |
| 2019/0182572 | A1* | 6/2019 | Kim ........................ H04R 7/045 |
| 2019/0196247 | A1* | 6/2019 | Shin ........................ H04R 1/028 |
| 2019/0196537 | A1* | 6/2019 | Choi ........................ H04R 7/045 |
| 2019/0200111 | A1* | 6/2019 | Kang ...................... H04R 7/045 |
| 2019/0208300 | A1* | 7/2019 | Lee ......................... H04R 17/00 |
| 2020/0053441 | A1* | 2/2020 | Kim ..................... G06F 3/0412 |
| 2020/0077194 | A1* | 3/2020 | Kim ........................ H04R 7/26 |
| 2020/0092650 | A1* | 3/2020 | Ham ........................ H04R 5/04 |

(Continued)

FOREIGN PATENT DOCUMENTS

| KR | 101704517 B1 | 2/2017 |
| KR | 101746496 B1 | 6/2017 |
| KR | 101780302 B1 | 9/2017 |

(Continued)

*Primary Examiner* — Simon King

(74) *Attorney, Agent, or Firm* — Cantor Colburn LLP

(57) ABSTRACT

A display device includes a display panel including a first area and a second area, a sound generator disposed in at least one of the first and second areas on the display panel, a partition member disposed at a boundary between the first and second areas on the display panel, and extending in a predetermined direction, and a blocking member disposed in at least one of the first and second areas on the display panel, and spaced apart from the partition member.

19 Claims, 10 Drawing Sheets

(56) References Cited

U.S. PATENT DOCUMENTS

2020/0379508 A1* 12/2020 Lee ........................ H04R 9/066

FOREIGN PATENT DOCUMENTS

| KR | 101780297 B1 | 10/2017 |
| KR | 1020170115124 A | 10/2017 |
| KR | 1020170135465 A | 12/2017 |
| KR | 101817102 B1 | 1/2018 |
| KR | 101817103 B1 | 1/2018 |
| KR | 101817105 B1 | 2/2018 |
| KR | 1020190074540 A | 6/2019 |
| KR | 1020190134025 A | 12/2019 |

* cited by examiner

DISPLAY DEVICE

This application claims priority to Korean Patent Application No. 10-2020-0098599, filed on Aug. 6, 2020, and all the benefits accruing therefrom under 35 U.S.C. § 119, the content of which in its entirety is herein incorporated by reference.

BACKGROUND

1. Field

Embodiments of the invention relate to a display device.

2. Description of the Related Art

Flat panel display devices are replacing cathode ray tube display devices due to advantages such as lightweight and thin characteristics. Representative examples of such flat panel display devices include liquid crystal display devices and organic light emitting diode display devices.

The flat panel display device may include a display panel for displaying an image and a sound generator for providing sound. The sound generator may output sound by vibrating the display panel. The display panel may be divided into a plurality of areas, and a plurality of sound generators may be disposed in corresponding ones of the areas, respectively, for example. Accordingly, the flat panel display device may implement stereophonic sound or surround sound through a plurality of sound channels.

SUMMARY

Embodiments of the invention provide a display device including a plurality of sound channels and having improved sound quality.

Additional features of the invention will be set forth in the description which follows, and in part will be apparent from the description, or may be learned by practice of the invention.

A display device in an embodiment includes a display panel including a first area and a second area, a sound generator disposed in at least one of the first and second areas on the display panel, a partition member disposed at a boundary between the first and second areas on the display panel, and extending in a predetermined direction, and a blocking member disposed in at least one of the first and second areas on the display panel, and spaced apart from the partition member.

In an embodiment, the blocking member may extend in the predetermined direction.

In an embodiment, a length of the blocking member in the predetermined direction may be less than a length of the partition member in the predetermined direction.

In an embodiment, the blocking member may include a plurality of blocking patterns spaced apart from each other in the predetermined direction.

In an embodiment, at least a part of the blocking member may be inclined with respect to the partition member.

In an embodiment, a distance between the blocking member and the partition member may be less than a distance between the blocking member and the sound generator.

In an embodiment, the display device may further include a support member disposed on the display panel and surrounding the first area and the second area.

In an embodiment, the blocking member may be spaced apart from the support member.

In an embodiment, the partition member may contact the support member.

In an embodiment, the display device may further include an auxiliary blocking member facing the blocking member and symmetric with respect to the sound generator.

In an embodiment, the auxiliary blocking member may be spaced apart from the support member.

In an embodiment, the display panel may further include a first surface displaying an image and a second surface facing the first surface. The sound generator may contact the second surface of the display panel.

A display device in an embodiment includes a display panel including a first area, a second area, and a third area disposed between the first and second areas, a sound generator disposed in at least one of the first to third areas on the display panel, a first partition member disposed at a boundary between the first and third areas on the display panel, a second partition member disposed at a boundary between the second and third areas on the display panel, a first blocking member disposed in at least one of the first and third areas on the display panel, and spaced apart from the first partition member, and a second blocking member disposed in at least one of the second and third areas on the display panel, and spaced apart from the second partition member.

In an embodiment, the display device may further include a support member disposed on the display panel and surrounding the first to third areas.

In an embodiment, each of the first and second blocking members may be spaced apart from the support member.

In an embodiment, each of the first and second partition members may contact the support member.

A display device in an embodiment includes a display panel including a first area, a second area, a third area, and a fourth area arranged in two rows and two columns, at a sound generator disposed in at least one of the first to fourth areas on the display panel, a first partition member extending in a first direction, disposed at a boundary between the first and second areas on the display panel, and disposed at a boundary between the third and fourth areas on the display panel, a second partition member extending in a second direction crossing the first direction, disposed at a boundary between the first and third areas on the display panel, and disposed at a boundary between the second and fourth areas on the display panel, a first blocking member disposed in at least one of the first and second areas on the display panel, and spaced apart from each of the first and second partition members, a second blocking member disposed in at least one of the third and fourth areas on the display panel, and spaced apart from each of the first and second partition members, a third blocking member disposed in at least one of the first and third areas on the display panel, and spaced apart from each of the first and second partition members, and a fourth blocking member disposed in at least one of the second and fourth areas on the display panel, and spaced apart from each of the first and second partition members.

In an embodiment, the display device may further include a support member disposed on the display panel and surrounding the first to fourth areas.

In an embodiment, each of the first to fourth blocking members may be spaced apart from the support member.

In an embodiment, each of the first and second partition members may contact the support member.

The display device in embodiments may include the blocking member spaced apart from each of the partition member and the support member. Accordingly, the display device may decay the sound waves generated from the sound generator in the space between the blocking member and the partition member. Accordingly, the display device may prevent or reduce interference or distortion of sound between sound channels, and may prevent or reduce the reduction of the sound pressure caused by reflected waves or standing waves. In addition, as the area in which the display panel vibrates may be widened, the sound quality of the display device including sound pressure may be improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the invention

DETAILED DESCRIPTION

Figure 1:
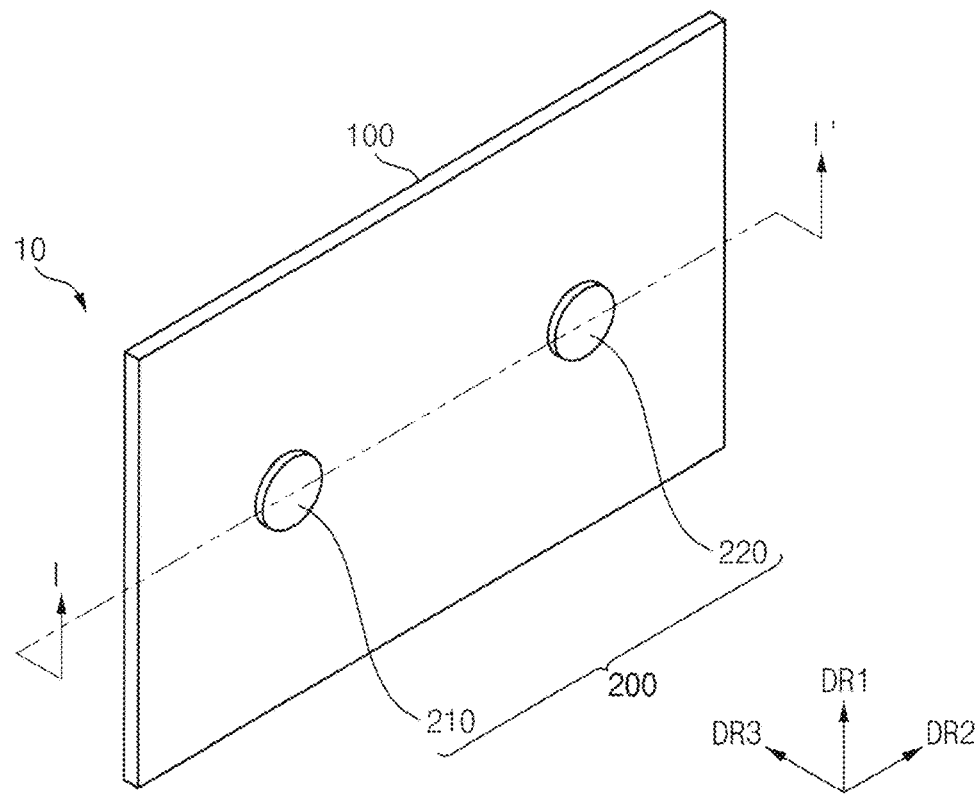
FIG. 1 is a perspective view illustrating an embodiment of a display device.

Illustrative, non-limiting embodiments will be more clearly understood from the following detailed description in conjunction with the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
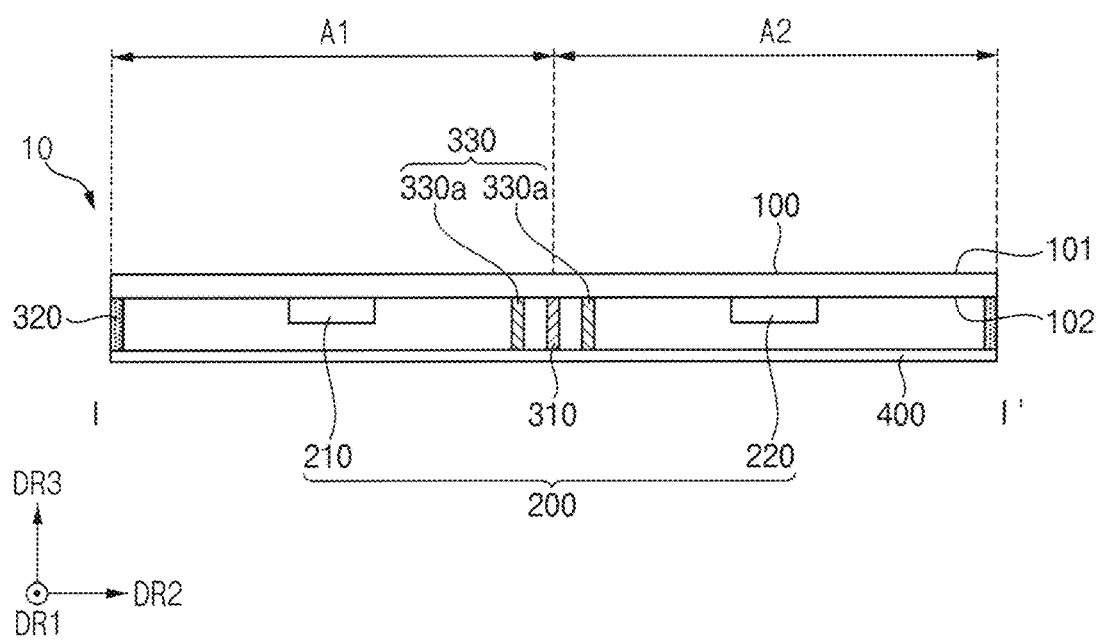
FIG. 2 is a cross-sectional view taken along line I-I' of FIG. 1.
Figure 3:
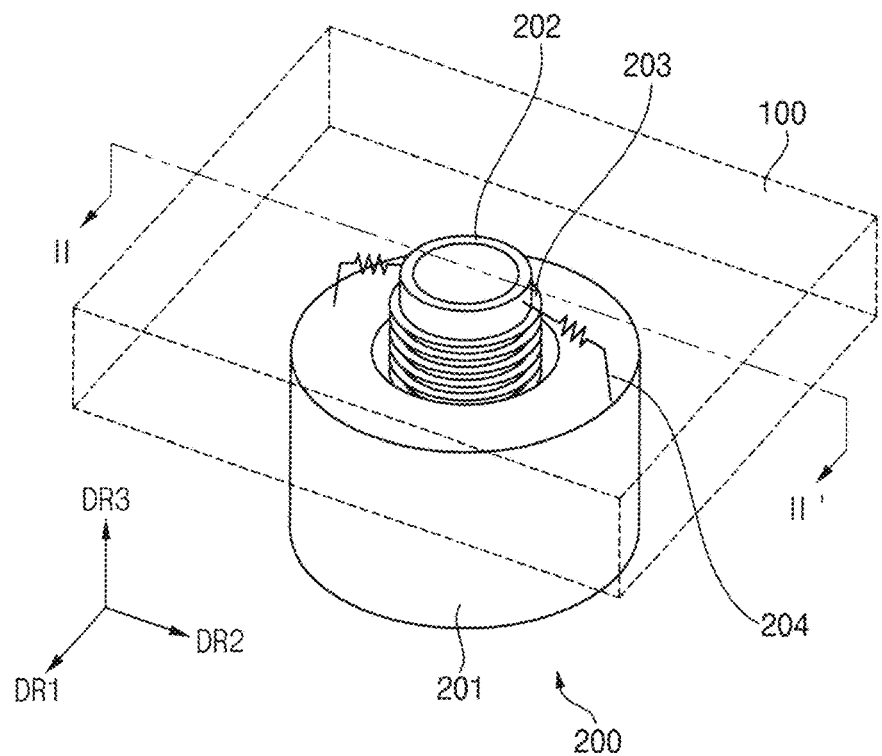
FIG. 3 is an exploded perspective view illustrating an embodiment of a sound generator.
Figure 4:
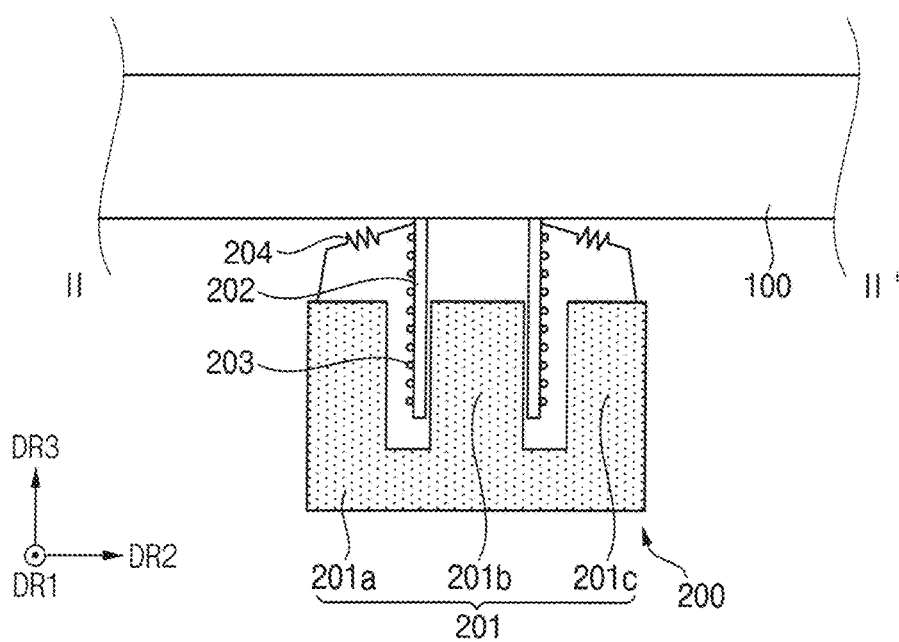
FIG. 4 is a cross-sectional view taken along line II-II' of FIG. 3.
Figure 5:
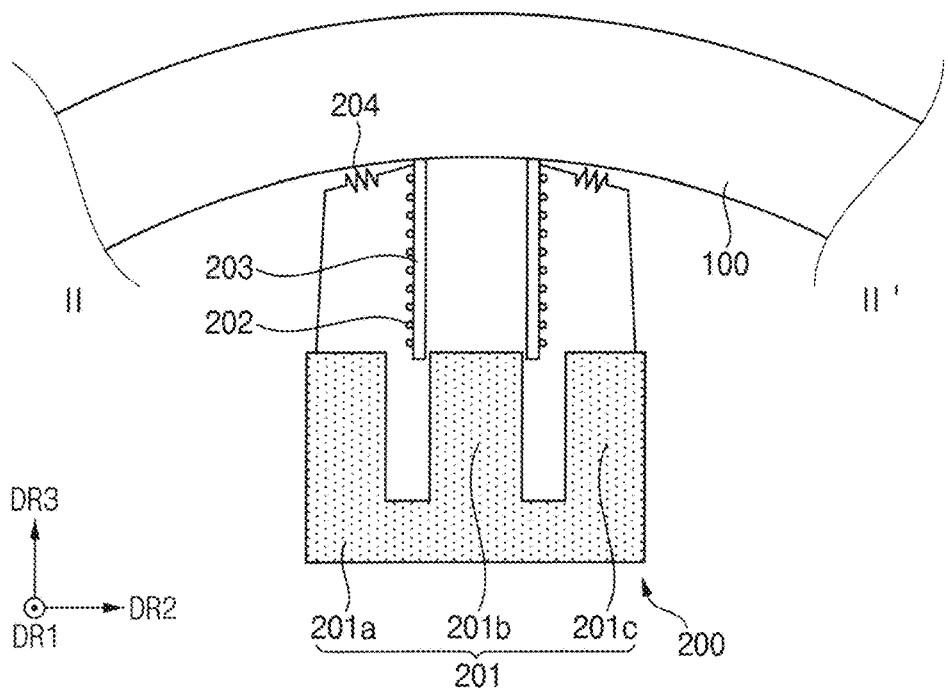
FIGS. 5 and 6 are cross-sectional views illustrating vibration of a display panel by the sound generator of FIG. 3.
Figure 6:
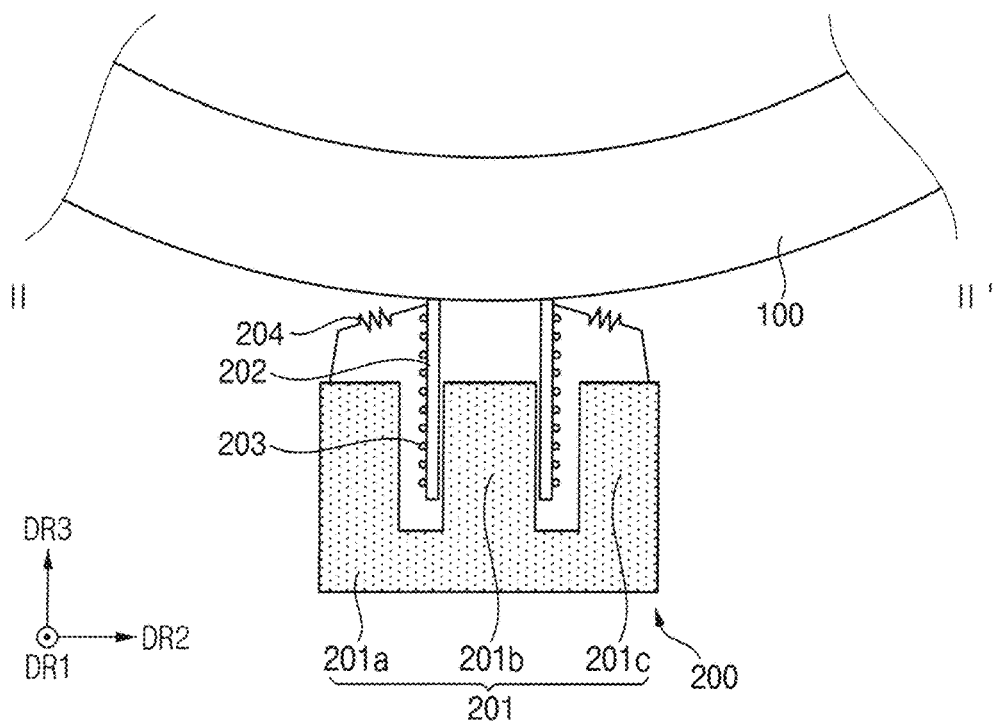
Figure 7:
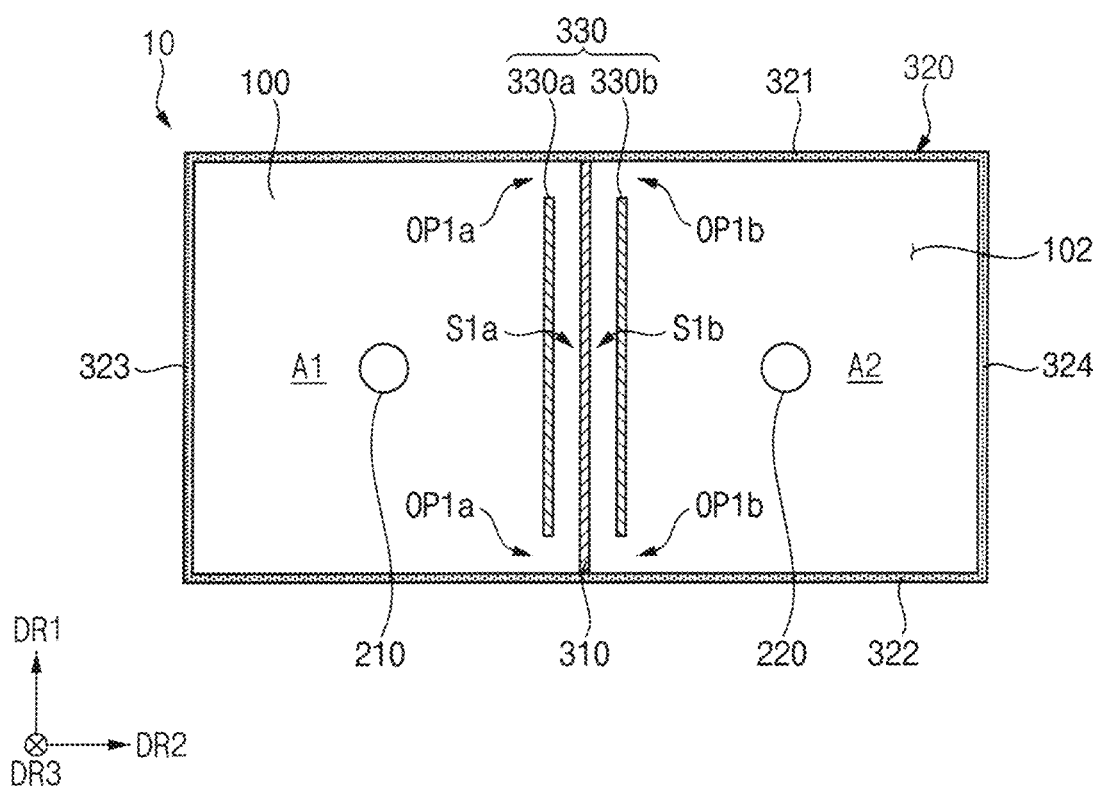
FIG. 7 is a plan view illustrating an embodiment of the display device of FIG. 1.

FIG. 1 is a perspective view illustrating an embodiment of a display device. FIG. 2 is a cross-sectional view taken along line I-I' of FIG. 1. FIG. 3 is an exploded perspective view illustrating an embodiment of a sound generator. FIG. 4 is a cross-sectional view taken along line II-II' of FIG. 3. FIGS. 5 and 6 are cross-sectional views illustrating vibration of a display panel by the sound generator of FIG. 3. FIG. 7 is a plan view illustrating an embodiment of the display device of FIG. 1.

Referring to FIGS. 1 to 7, an embodiment of a display device 10 may include a display panel 100, at least one sound generator 200, a partition member 310, a support member 320, at least one blocking member 330, and a cover member 400.

The display panel 100 displaying an image may be provided in various shapes. In an embodiment, as illustrated in FIG. 1, the display panel 100 may have a quadrangular (e.g., rectangular) shape in a plane view, for example. In an embodiment, the display panel 100 may have a short side extending in a first direction DR1 and a long side extending in a second direction DR2 crossing the first direction DR1, for example. In another embodiment, the display panel 100 may have a different polygonal, a circular, or an elliptical planar shape, for example.

The display panel 100 may include a first surface 101 displaying the image and a second surface 102 facing the first surface 101. The sound generator 200 may be disposed on the second surface 102 of the display panel 100. In an embodiment, the sound generator 200 may contact the second surface 102 of the display panel 100, and may vibrate the display panel 100 to output sound, for example.

In an embodiment, the display device 10 may further include a sound driver (not illustrated) electrically connected to the sound generator 200. The sound driver may output a sound signal to the sound generator 200. In an embodiment, the sound signal may include a first driving voltage and a second driving voltage, for example. The sound driver may be electrically connected to the sound generator 200 through a first sound line (not illustrated) and a second sound wire (not illustrated). The sound generator 200 may receive the first driving voltage through the first sound line, and may receive the second driving voltage through the second sound line. In an embodiment, the first and second driving voltages may be alternating current ("AC") voltages that swing between a positive level and a negative level with respect to a predetermined reference level, for example. In an embodiment, the sound driver may generate the sound signal based on a sound data received from an external device, and may output the sound signal to the sound generator 200, for example.

The sound generator 200 may output sound by vibrating the display panel 100 based on the sound signal input from the sound driver. In an embodiment, the sound generator 200 may vibrate the display panel 100 in a third direction DR3 perpendicular to the second surface 102 based on the first driving voltage and the second driving voltage, for example. In an embodiment, the sound generator 200 may be an exciter which generates a magnetic force using a voice coil and thereby causes the display panel 100 to vibrate, for example. In another embodiment, the sound generator 200 may be a piezoelectric element that contracts or expands in accordance with a voltage applied thereto and thereby causes the display panel 100 to vibrate.

In an embodiment, as illustrated in FIGS. 3 to 6, the sound generator 200 may be an exciter which generates a magnetic force using a voice coil and thereby causes the display panel 100 to vibrate. In an embodiment, the sound generator 200 may include a magnet 201, a bobbin 202, a voice coil 203, and dampers 204, for example.

The magnet 201 may be a permanent magnet, and a sintered magnet such as a barium ferrite magnet may be used. In an embodiment, the magnet 201 may be provided as a ferric trioxide ($Fe_2O_3$) magnet, a barium carbonate ($BaCO_3$) magnet, a neodymium magnet, a strontium ferrite magnet with an improved magnetic component, an Al, nickel (Ni), or cobalt (Co) cast alloy magnet, for example. In an embodiment, the neodymium magnet may be a neodymium-iron-boron (Nd—Fe—B) magnet, for example.

The magnet 201 may include a plate 201a, a central protruding portion 201b protruding from the center of the plate 201a, and an edge protruding portion 201c protruding from an edge of the plate 201a. In an embodiment, the plate 201a of the magnet 201 may be fixed to a part of the cover member 400, for example. The central protruding portion 201b and the edge protruding portion 201c may be spaced apart from each other. Accordingly, a space may be defined between the central protruding portion 201b and the edge protruding portion 201c.

In an embodiment, the central protruding portion 201b of the magnet 201 may have N-pole magnetism, and the plate 201a and the edge protruding portion 201c may have S-pole magnetism, for example. Accordingly, an external magnetic field may be generated between the central protruding portion 201b and the plate 201a, and between the central protruding portion 201b and the edge protruding portion 201c.

The bobbin 202 may be provided in a cylindrical shape. The central protruding portion 201b of the magnet 201 may be disposed in the bobbin 202. That is, the bobbin 202 may be disposed to surround the central protruding portion 201b of the magnet 201. The edge protruding portion 201c of the magnet 201 may be disposed on the outside of the bobbin 202. That is, the edge protruding portion 201c of the magnet 201 may be disposed to surround the bobbin 202. Spaces may be defined between the bobbin 202 and the central protruding portion 201b of the magnet 201, and between the bobbin 202 and the edge protruding portion 201c of the magnet 201.

In an embodiment, the bobbin 202 may include a pulp-processed or paper-processed material, Al, Mg, or an alloy thereof, a synthetic resin such as polypropylene, or polyamide-based fibers. In an embodiment, an end of the bobbin 202 may be attached to the second surface 102 of the display panel 100, for example.

The voice coil 203 may be wound around the outer circumferential surface of the bobbin 202. The first sound line may be connected to an end of the voice coil 203 adjacent to the end of the bobbin 202. The second sound line may be connected to another end of the voice coil 203. The first driving voltage may be applied to the first sound line. The second driving voltage may be applied to the second sound line. Accordingly, a current may flow in the voice coil 203, and an applied magnetic field may be generated around the voice coil 203. In an embodiment, a direction of the current that flows in the voice coil 203 when the first driving voltage is a positive voltage and the second driving voltage is a negative voltage may be opposite to a direction of the current that flows in the voice coil 203 when the first driving voltage is a negative voltage and the second driving voltage is a positive voltage, for example. Accordingly, as the first and second driving voltages are alternately driven, the N pole and the S pole of the applied magnetic field may be changed. Accordingly, an attracting force and a repulsive force may be alternately acted upon the magnet 201 and the voice coil 203. Accordingly, the bobbin 202, which has the voice coil 203 wound therearound may reciprocate in the third direction DR3 as illustrated in FIGS. 5 and 6. Accordingly, the display panel 100 may vibrate in the third direction DR3, and sound may be output.

The dampers 204 may be disposed between the top of the bobbin 202 and the edge protruding portion 201c of the magnet 201. The dampers 204 may contract or expand in accordance with a vertical movement of the bobbin 202 and may thus control the vertical vibration of the bobbin 202. That is, the vertical movement of the bobbin 202 may be limited by a restoring force of the dampers 204. In an embodiment, when the bobbin 202 vibrates above or below a predetermined height, the bobbin 202 may return to its original position due to the restoring force of the dampers 204, for example.

In an embodiment, as illustrated in FIGS. 1, 2 and 7, the display panel 100 may include a first area A1 and a second area A2. The sound generator 200 may be disposed in at least one of the first area A1 and the second area A2 on the display panel 100. In an embodiment, a first sound generator 210 may be disposed in the first area A1 on the display panel 100, and a second sound generator 220 may be disposed in the second area A2, for example. Accordingly, the display device 10 may provide 2.0 channel stereo sound to a user.

The first sound generator 210 may vibrate the first area A1 of the display panel 100 based on a first sound signal input from the sound driver. As a first sound wave may be generated by vibration of the first area A1 of the display panel 100, a first sound may be output. The second sound generator 220 may vibrate the second area A2 of the display panel 100 based on a second sound signal input from the sound driver. As a second sound wave may be generated by the vibration of the second area A2 of the display panel 100, a second sound may be output. Accordingly, the display device 10 may provide the 2.0 channel stereo sound to the user.

The partition member 310 may be disposed between the first area A1 and the second area A2 on the display panel 100. In an embodiment, the partition member 310 may be disposed at a boundary between the first area A1 and the second area A2 on the second surface 102 of the display panel 100, for example. That is, the display panel 100 may be divided into the first area A1 and the second area A2 by the partition member 310.

In an embodiment, as illustrated in FIG. 7, the partition member 310 may extend in the first direction DR1, for example. That is, the second area A2 may be disposed in the second direction DR2 from the first area A1.

In an embodiment, the partition member 310 may include polyurethane, polyolefin, silicone, rubber, aerogel, or the like, for example. In an embodiment, the partition member 310 may include a single-sided tape, a double-sided tape, an acrylic adhesive, a silicone adhesive, or the like.

The support member 320 may be disposed between the display panel 100 and the cover member 400. In an embodiment, the support member 320 may be disposed at edges of the display panel 100, for example. That is, the support member 320 may be disposed on the display panel 100 to entirely surround the first area A1 and the second area A2. In an embodiment, a surface of the support member 320 may contact the second surface 102 of the display panel 100, and another surface of the support member 320 may contact a surface of the cover member 400, for example. Accordingly, a space may be defined between the display panel 100 and the cover member 400.

In an embodiment, the support member 320 may include a substantially same material as that of the partition member 310, for example. In an embodiment, the support member 320 may include polyurethane, polyolefin, silicone, rubber, aerogel, or the like, for example. In an embodiment, the support member 320 may include a single-sided tape, a double-sided tape, an acrylic adhesive, a silicone adhesive, or the like.

The support member 320 may contact the partition member 310. In an embodiment, as illustrated in FIG. 7, the partition member 310 extending in the first direction DR1 may contact first and second long sides 321 and 322 of the support member 320, for example. Each of the first and second long sides 321 and 322 may extend in the second direction DR2.

The blocking member 330 may be disposed in at least one of the first area A1 and the second area A2 on the display panel 100. In an embodiment, the blocking members 330a and 330b may be disposed in the first and second areas A1 and A2 on the display panel 100, respectively, for example. Each of the blocking members 330a and 330b may be spaced apart from the partition member 310 and the support member 320.

In an embodiment, the blocking member 330 may include a substantially same material as that of the partition member 310, for example. In an embodiment, the blocking member 330 may include polyurethane, polyolefin, silicone, rubber, aerogel, or the like, for example. In an embodiment, the blocking member 330 may include a single-sided tape, a double-sided tape, an acrylic adhesive, a silicone adhesive, or the like.

Each of the blocking members 330a and 330b may be disposed closer to the partition member 310 than to each of the first and second sound generators 210 and 220. In an embodiment, a distance in the second direction DR2 between the blocking member 330a disposed in the first area A1 and the partition member 310 may be less than a distance in the second direction DR2 between the blocking member 330a and the first sound generator 210, for example. In addition, a distance in the second direction DR2 between the blocking member 330b disposed in the second area A2 and the partition member 310 may be less than a distance in the second direction DR2 between the blocking member 330b and the second sound generator 220.

In an embodiment, as illustrated in FIG. 7, each of the blocking members 330a and 330b may extend in the first direction DR1, and may be spaced apart from the partition member 310, for example. That is, each of the blocking members 330a and 330b may be parallel to the partition member 310, and may be spaced apart from the partition member 310 at a predetermined distance. Accordingly, first spaces S1a and S1b may be defined between the blocking member 330a and the partition member 310, and between the blocking member 330b and the partition member 320, respectively.

In an embodiment, each of the blocking members 330a and 330b may extend in the first direction DR1, and may be spaced apart from the support member 320, for example. That is, each of the blocking members 330a and 330b may be spaced apart from the first and second long sides 321 and 322 of the support member 320. A length of each of the blocking members 330a and 330b in the first direction DR1 may be less than a length of the partition member 310 in the first direction DR1. In addition, the length of each of the blocking members 330a and 330b in the first direction DR1 may be less than a distance in the first direction DR1 between the first long side 321 of the support member 320 and the second long side 322 of the support member 320.

In an embodiment, first openings OP1a may be defined between the first long side 321 and an end of the blocking member 330a adjacent to the first long side 321, and between the second long side 322 and another end of the blocking member 330a adjacent to the second long side 322, for example. First openings OP1b may be defined between the first long side 321 and an end of the blocking member 330b adjacent to the first long side 321, and between the second long side 322 and another end of the blocking member 330b adjacent to the second long side 322.

At least a part of the first sound wave generated by the first sound generator 210 in the first area A1 may proceed to the blocking member 330a or the first openings OP1a. A part of the first sound wave proceeded to the blocking member 330a may be attenuated while passing through the blocking member 330a. A part of the first sound wave proceeded to the first openings OP1a may be incident into the first space S1a between the blocking member 330a and the partition member 310 through the first openings OP1a, and may be attenuated in the first space S1a.

At least a part of the second sound wave generated by the second sound generator 220 in the second area A2 may proceed to the blocking member 330b or the first openings OP1b. A part of the second sound wave proceeded to the blocking member 330b may be attenuated while passing through the blocking member 330b. A part of the second sound wave proceeded to the first openings OP1b may be incident into the first space S1b between the blocking member 330b and the partition member 310 through the first openings OP1b, and may be attenuated in the first space S1b.

In a conventional display device, in order to reduce sound interference between two channel areas in which a display panel vibrates, a neutral area in which the display panel does not vibrate may be additionally provided between the two channel areas. In this case, as an area in which the display panel vibrates to output sound may be reduced, a sound quality of the display device including sound pressure may be reduced.

The display device 10 in embodiments may include the blocking member 330 spaced apart from each of the partition member 310 and the support member 320. Accordingly, it is possible to prevent or reduce propagation of the first sound wave generated in the first area A1 to the second area A2, and propagation of the second sound wave generated in the second area A2 to the first area A1. Accordingly, the display device 10 may prevent or reduce interference or distortion of sound between sound channels. In addition, as an area in which the display panel 100 vibrates may be widened, a sound quality of the display device 10 including sound pressure may be improved. In addition, as at least some of the first and second sound waves may be attenuated and disappeared in the first spaces S1a and S1b through the first openings OP1a and OP1b, the display device 10 may prevent or reduce a reduction of the sound pressure caused by reflected waves or standing waves.

Figure 8:
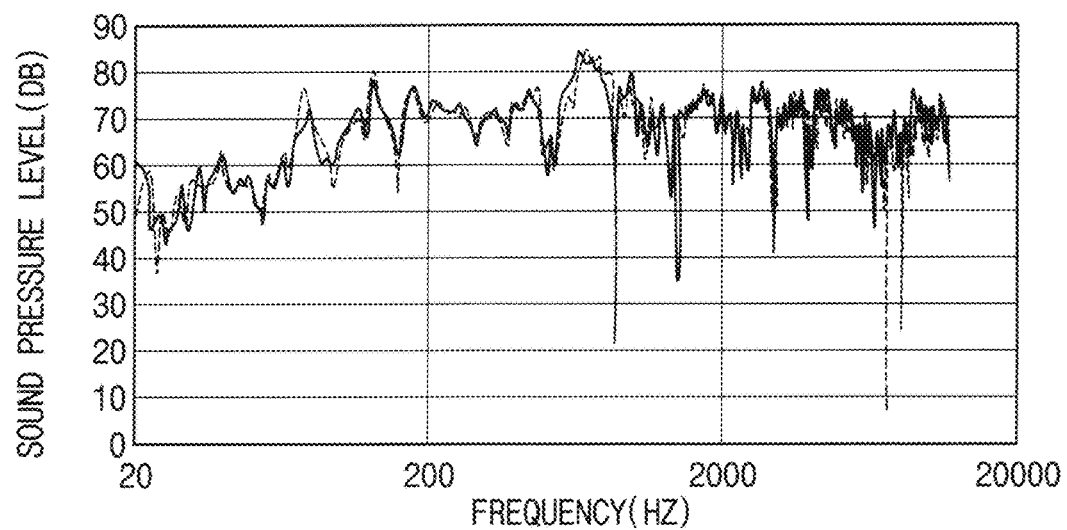
FIGS. 8 and 9 are graphs illustrating sound output characteristics of the display device of FIG. 1.
Figure 9:
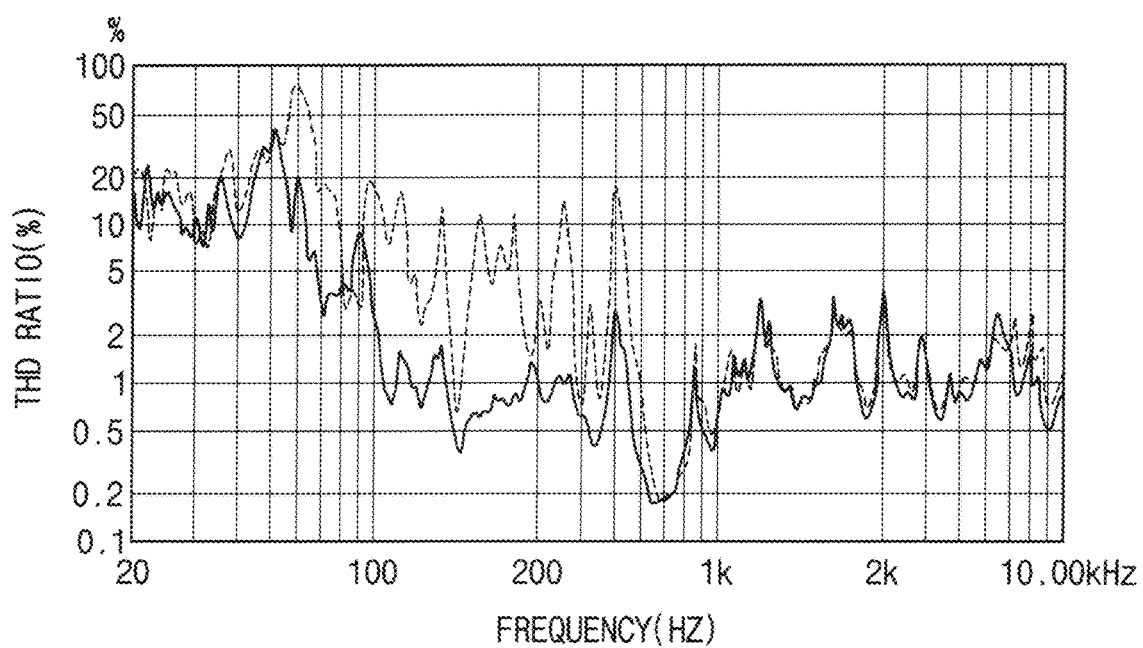

FIGS. 8 and 9 are graphs illustrating sound output characteristics of the display device of FIG. 1. In FIG. 8, the x-axis may represent a frequency in terms of hertz (HZ) and the y axis may represent a sound pressure level in terms of decibel (DB). In FIG. 9, the x-axis may represent a frequency in terms of HZ and the y axis may represent a total harmonic distortion ("THD") ratio in terms of percentage (%).

In FIGS. 8 and 9, a dotted line illustrates a sound output characteristics of a conventional display device in which a neutral region in which the display panel does not vibrate is provided, and a solid line illustrates a sound output characteristic of an embodiment of the display device 10. Referring to FIGS. 8 and 9, the display device 10 in an embodiment may reduce a formation of the THD and deep frequencies due to sound interference between channels, reflected waves, or standing waves, compared to the conventional display device.

Figure 10:
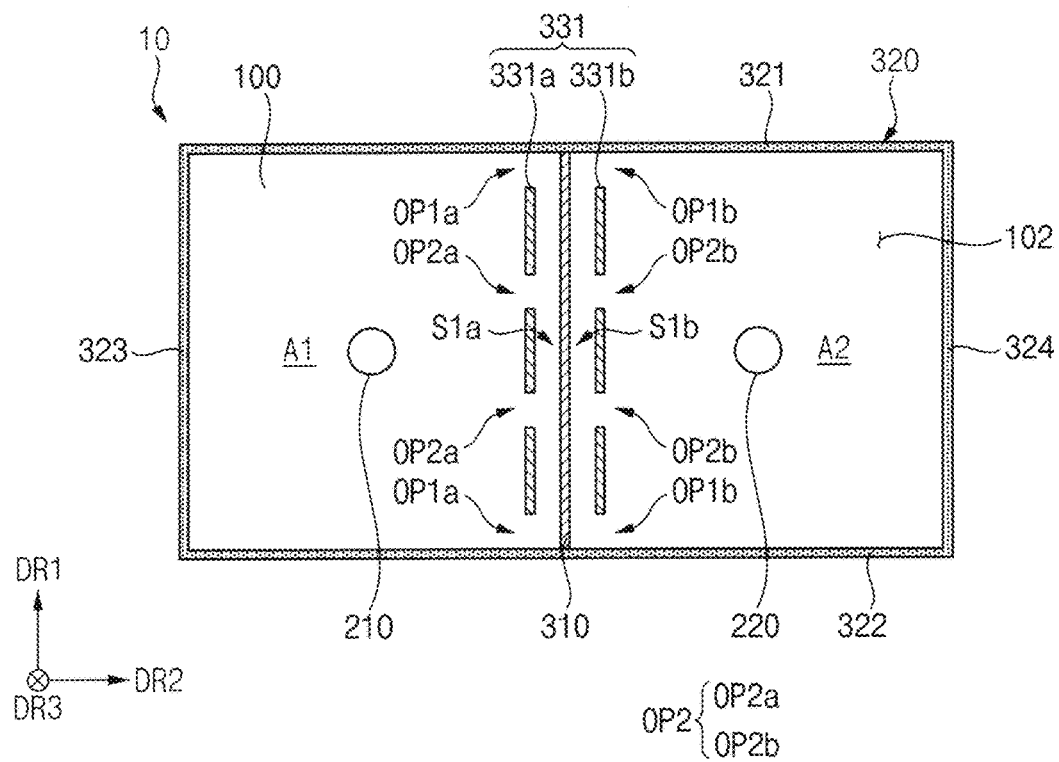
FIG. 10 is a plan view illustrating another embodiment of the display device of FIG. 1.

FIG. 10 is a plan view illustrating another embodiment of the display device of FIG. 1.

Referring to FIG. 10, for example, the blocking member 331 may include a plurality of blocking patterns spaced apart from each other in the first direction DR1. Accordingly, at least one second opening OP2 may be defined between two blocking patterns adjacent to each other.

At least a part of the first sound wave generated by the first sound generator 210 in the first area A1 may proceed to the second opening OP2a. A part of the first sound wave proceeded to the second opening OP2a may be diffracted while passing through the second opening OP2a. A part of the diffracted first sound wave may be attenuated in the first space S1a between the blocking member 331a and the partition member 310.

At least a part of the second sound wave generated by the second sound generator 220 in the second area A2 may proceed to the second opening OP2b. A part of the second sound wave proceeded to the second opening OP2b may be diffracted while passing through the second opening OP2b. A part of the diffracted second sound wave may be attenuated in the first space S1b between the blocking member 331b and the partition member 310.

Figure 11:
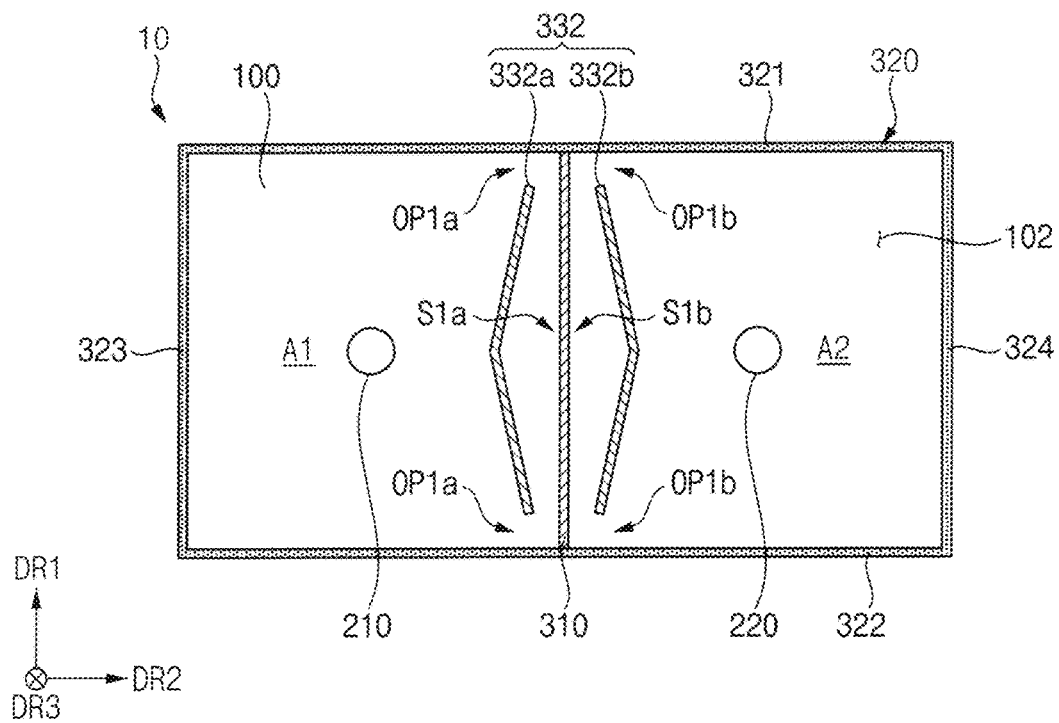
FIG. 11 is a plan view illustrating still another embodiment of the display device of FIG. 1.

FIG. 11 is a plan view illustrating still another embodiment of the display device of FIG. 1.

Referring to FIG. 11, for example, at least a part of the blocking member 332 may be inclined with respect to the partition member 310. In an embodiment, each of the blocking members 332a and 332b may include a plurality of blocking patterns inclined with respect to the partition member 310, for example. An end of each of the blocking patterns may contact each other. In an embodiment, each of the blocking patterns may be inclined with respect to the partition member 310 such that the end of each of the blocking patterns faces corresponding one of the first and second sound generator 210 and 220, for example.

At least a part of the first sound wave proceeding to the blocking member 332a may be reflected by the blocking member 332a, and at least a part of the second sound wave proceeding to the blocking member 332b may be reflected by the blocking member 332b. As at least a part of each of the blocking members 332a and 332b may be inclined with respect to the partition member 310, at least a part of each of the reflected first and second sound waves may change a proceeding direction. Accordingly, the display device 10 may prevent or reduce the reduction of the sound pressure caused by reflected waves or standing waves.

Figure 12:
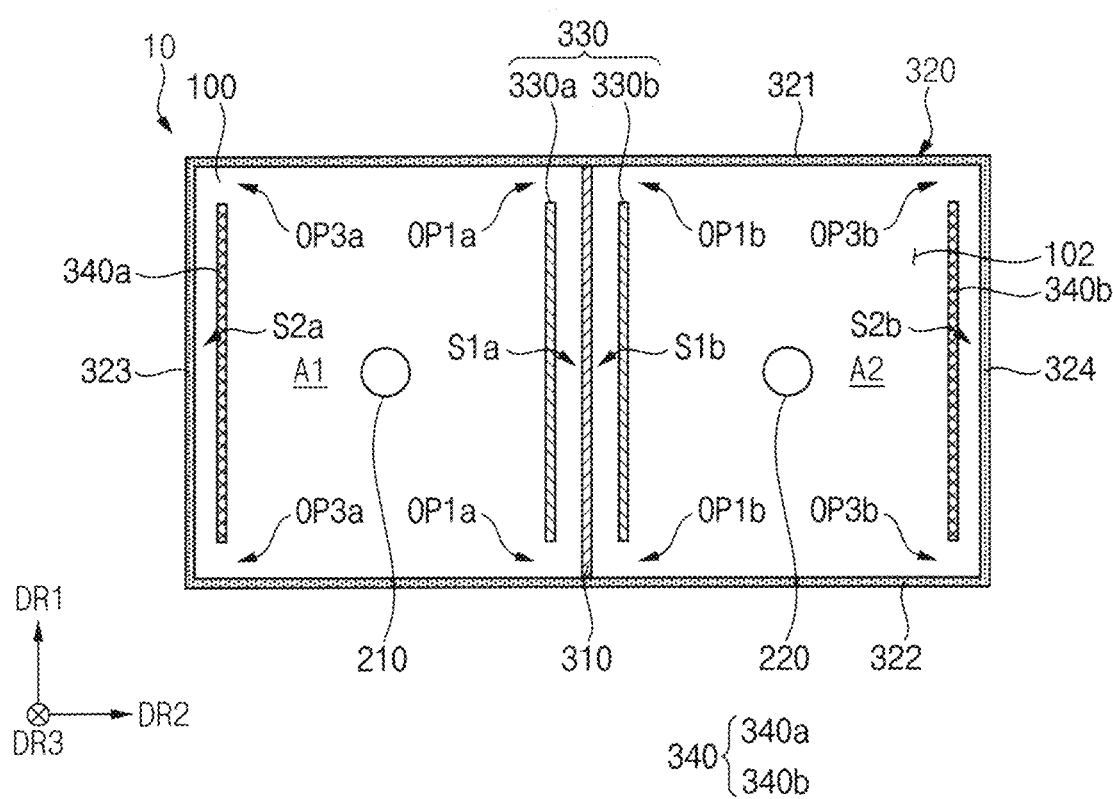
FIG. 12 is a plan view illustrating still another embodiment of the display device of FIG. 1.

FIG. 12 is a plan view illustrating still another embodiment of the display device of FIG. 1.

Referring to FIG. 12, for example, the display device 10 may further include at least one auxiliary blocking member 340. In an embodiment, the auxiliary blocking member 340a may be disposed in the first area A1 to face the blocking member 330a, and the auxiliary blocking member 340b may be disposed in the second area A2 to face the blocking member 330b, for example. In an embodiment, the auxiliary blocking member 340a may be symmetric with the blocking member 330a with respect to the first sound generator 210, and the auxiliary blocking member 340b may be symmetric with the blocking member 330b with respect to the second sound generator 220, for example.

Each of the auxiliary blocking members 340a and 340b may be disposed closer to the support member 320 than to each of the first and second sound generators 210 and 220. In an embodiment, a distance in the second direction DR2 between the auxiliary blocking member 340a and a first short side 323 of the support member 320 may be less than a distance between the auxiliary blocking member 340a and the first sound generator 210, for example. A distance in the second direction DR2 between the auxiliary blocking member 340b and a second short side 324 of the support member 320 may be less than a distance between the auxiliary blocking member 340b and the second sound generator 220.

In an embodiment, as illustrated in FIG. 12, each of the auxiliary blocking members 340a and 340b may extend in the first direction DR1, and may be spaced apart from the support member 320, for example. That is, the auxiliary blocking member 340a may be parallel to the first short side 323 of the support member 320, and may be spaced apart from the first short side 323 at a predetermined distance. The auxiliary blocking member 340b may be parallel to the second short side 324 of the support member 320, and may be spaced apart from the second short side 324 at a predetermined distance. Accordingly, second spaces S2a and S2b may be defined between the auxiliary blocking member 340a and the first short side 323 of the support member 320, and between the auxiliary blocking member 340b and the second short side 324 of the support member 320, respectively.

In an embodiment, each of the auxiliary blocking members 340a and 340b may extend in the first direction DR1, and may be spaced apart from the first and second long sides 321 and 322 of the support member 320, for example. A length of the auxiliary blocking member 340a in the first direction DR1 may be less than a length of the first short side 323 in the first direction DR1, and a length of the auxiliary blocking member 340b in the first direction DR1 may be less than a length of the second short side 324 in the first direction DR1.

In an embodiment, third openings OP3a may be defined between the first long side 321 and an end of the auxiliary blocking member 340a adjacent to the first long side 321, and between the second long side 322 and another end of the auxiliary blocking member 340a adjacent to the second long side 322, for example. Third openings OP3b may be defined between the first long side 321 and an end of the auxiliary blocking member 340b adjacent to the first long side 321, and between the second long side 322 and another end of the auxiliary blocking member 340b adjacent to the second long side 322.

At least a part of the first sound wave generated by the first sound generator 210 in the first area A1 may proceed to the auxiliary blocking member 340a or the third openings OP3a. A part of the first sound wave proceeded to the auxiliary blocking member 340a may be attenuated while passing through the auxiliary blocking member 340a. A part of the first sound wave proceeded to the third openings OP3a may be incident into the second space S2a between the auxiliary blocking member 340a and the first short side 323 of the support member 320 through the third openings OP3a, and may be attenuated in the second space S2a. At least a part of the second sound wave generated by the second sound generator 220 in the second area A2 may proceed to the auxiliary blocking member 340b or the third openings OP3b. A part of the second sound wave proceeded to the auxiliary blocking member 340b may be attenuated while passing through the auxiliary blocking member 340b. A part of the second sound wave proceeded to the third openings OP3b may be incident into the second space S2b between the auxiliary blocking member 340b and the second short side 324 of the support member 320 through the third openings OP3b, and may be attenuated in the second space S2b. Accordingly, the display device 10 may prevent or reduce the reduction of the sound pressure caused by reflected waves or standing waves.

In an embodiment, each of the auxiliary blocking members 340a and 340b may include a substantially same material as that of the partition member 310, for example. In an embodiment, each of the auxiliary blocking members 340a and 340b may include polyurethane, polyolefin, silicone, rubber, aerogel, or the like, for example. In addition, each of the auxiliary blocking members 340a and 340b may include a single-sided tape, a double-sided tape, an acrylic adhesive, a silicone adhesive, or the like.

Figure 13:
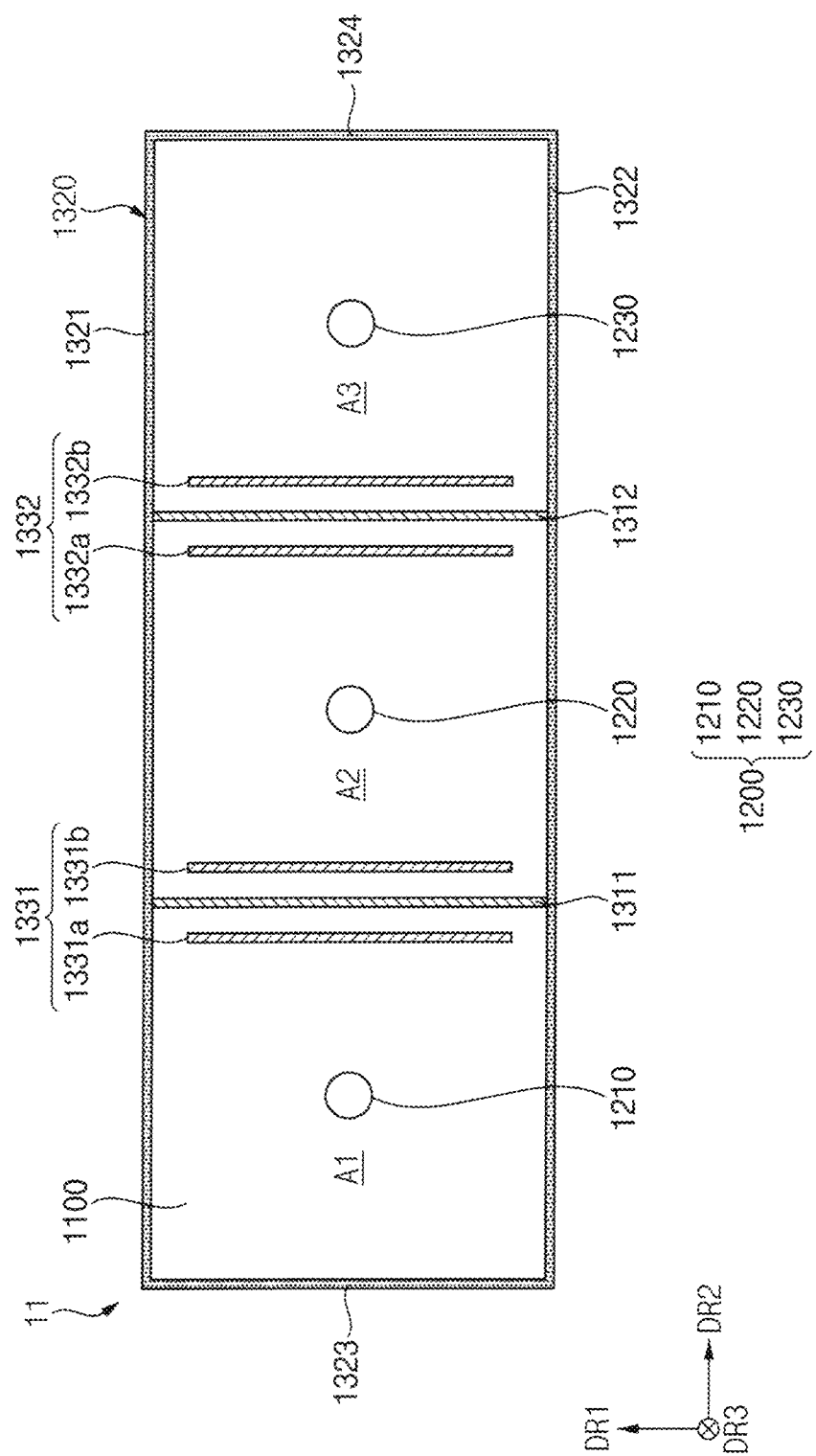
FIG. 13 is a plan view of another embodiment of a display device.

FIG. 13 is a plan view of another embodiment of a display device.

Referring to FIG. 13, a display device 11 according to another embodiment may include a display panel 1100, a sound generator 1200, first and second partition members 1311 and 1312, a support member 1320, and first and second blocking members 1331 and 1332. The display device 11 may be the substantially same as or similar to the display device 10 described with reference to FIG. 7 except that the display panel 1100 further includes a third area A3. Accordingly, detailed descriptions of components which are the substantially same as or similar to components of the display device 10 described with reference to FIG. 7 will be omitted.

The display panel 1100 may include first to third areas A1, A2, and A3. In an embodiment, as illustrated in FIG. 13, the first to third areas A1, A2, and A3 may be continuously arranged along the second direction DR2, for example. That is, the second area A2 may be disposed between the first area A1 and the third area A3.

The sound generator 1200 may be disposed in at least one of the first to third areas A1, A2, and A3 on the display panel 1100. In an embodiment, a first sound generator 1210 may be disposed in the first area A1 on the display panel 1100, a second sound generator 1220 may be disposed in the second area A2 on the display panel 1100, and a third sound generator 1230 may be disposed in the third area A3 on the display panel 1100, for example. Accordingly, the display device 11 may provide 3.0 channel stereo sound to a user.

The third sound generator 1230 may vibrate the third area A3 of the display panel 1100 based on a third sound signal input from a sound driver. As a third sound wave may be generated by the vibration of the third area A3 of the display panel 1100, a third sound may be output.

The first partition member 1311 may extend in the first direction DR1, and may be disposed at a boundary between the first area A1 and the second area A2 on the display panel 1100. The second partition member 1312 may extend in the first direction DR1, and may be disposed at a boundary between the second area A2 and the third area A3 on the display panel 1100. That is, the display panel 1100 may be divided into first to third areas A1, A2, and A3 by the first and second partition members 1311 and 1312.

The support member 1320 may be disposed on the display panel 1100 to entirely surround the first to third areas A1, A2, and A3. The support member 1320 may contact each of the first and second partition members 1311 and 1312. In an embodiment, as illustrated in FIG. 13, each of the first and second partition members 1311 and 1312 extending in the first direction DR1 may contact first and second long sides 1321 and 1322 of the support member 1320, for example.

The first blocking member 1331 may extend in the first direction DR1 parallel to the first and second short sides 1323 and 1324 of the support member 1320, and may be disposed in at least one of the first and second areas A1 and A2 on the display panel 1100. In an embodiment, the first blocking members 1331*a* and 1331*b* may be disposed in the first and second areas A1 and A2, respectively, on the display panel 1100, for example. Each of the first blocking members 1331*a* and 1331*b* may be spaced apart from the first partition member 1311 and the support member 1320.

The second blocking member 1332 may extend in the first direction DR1, and may be disposed in at least one of the second and third areas A2 and A3 on the display panel 1100. In an embodiment, the second blocking members 1332*a* and 1332*b* may be disposed in the second and third areas A2 and A3, respectively, on the display panel 1100, for example. Each of the second blocking members 1332*a* and 1332*b* may be spaced apart from the second partition member 1312 and the support member 1320.

Figure 14:
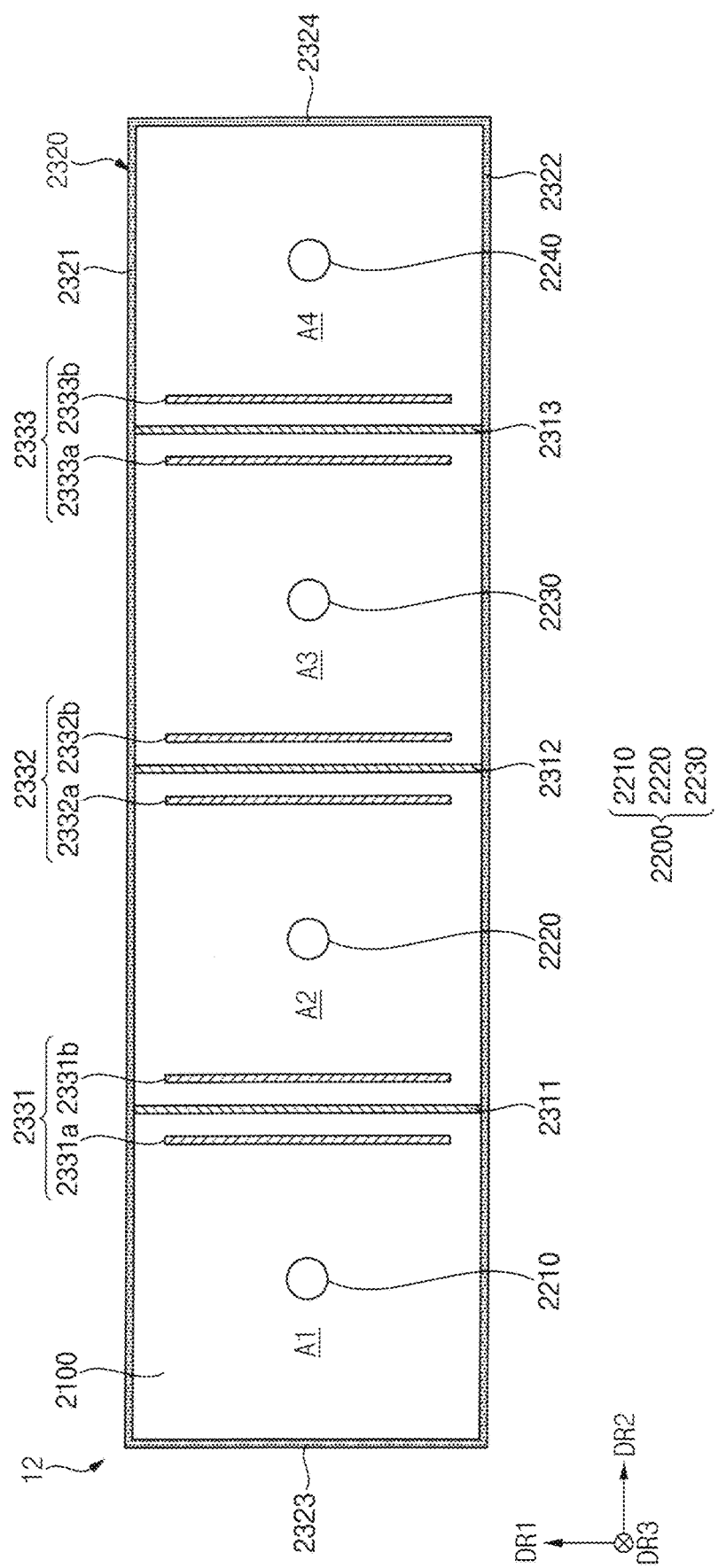
FIG. 14 is a plan view of another embodiment of a display device.

FIG. 14 is a plan view of another embodiment of a display device.

Referring to FIG. 14, a display device 12 in another embodiment may include a display panel 2100, a sound generator 2200, first to third partition members 2311, 2312 and 2313, a support member 2320, and first to third blocking members 2331, 2332 and 2333. The display device 12 may be the substantially same as or similar to the display device 11 described with reference to FIG. 13 except that the display panel 2100 further includes a fourth area A4. Accordingly, detailed descriptions of components which are the substantially same as or similar to components of the display device 11 described with reference to FIG. 13 will be omitted.

The display panel 2100 may include first to fourth areas A1, A2, A3 and A4. In an embodiment, as illustrated in FIG. 14, the first to fourth areas A1, A2, A3 and A4 may be continuously arranged along the second direction DR2, for example. That is, the second area A2 may be disposed between the first area A1 and the third area A3. The third area A3 may be disposed between the second area A2 and the fourth area A4.

The sound generator 2200 may be disposed in at least one of the first to fourth areas A1, A2, A3 and A4 on the display panel 2100. In an embodiment, a first sound generator 2210 may be disposed in the first area A1 on the display panel 2100, a second sound generator 2220 may be disposed in the second area A2 on the display panel 2100, a third sound generator 2230 may be disposed in the third area A3 on the display panel 2100, and a fourth sound generator 2240 may be disposed in the fourth area A4 on the display panel 2100, for example. Accordingly, the display device 12 may provide 4.0 channel stereo sound to a user.

The fourth sound generator 2240 may vibrate the fourth area A4 of the display panel 2100 based on a fourth sound signal input from a sound driver. As a fourth sound wave may be generated by the vibration of the fourth area A4 of the display panel 2100, a fourth sound may be output.

The first partition member 2311 may extend in the first direction DR1, and may be disposed at a boundary between the first area A1 and the second area A2 on the display panel 2100. The second partition member 2312 may extend in the first direction DR1, and may be disposed at a boundary between the second area A2 and the third area A3 on the display panel 2100. The third partition member 2313 may extend in the first direction DR1, and may be disposed at a boundary between the third area A3 and the fourth area A4 on the display panel 2100. That is, the display panel 2100 may be divided into first to fourth areas A1, A2, A3 and A4 by the first to third partition members 2311, 2312 and 2313.

The support member 2320 may be disposed on the display panel 2100 to entirely surround the first to fourth areas A1, A2, A3 and A4. The support member 2320 may contact each of the first to third partition members 2311, 2312 and 2313. In an embodiment, as illustrated in FIG. 14, each of the first to third partition members 2311, 2312 and 2313 extending in the first direction DR1 may contact first and second long sides 2321 and 2322 of the support member 2320, for example.

The first blocking member 2331 may extend in the first direction DR1 parallel to first and second short sides 2323 and 2324 of the support member 2320, and may be disposed in at least one of the first and second areas A1 and A2 on the display panel 2100. In an embodiment, the first blocking members 2331*a* and 2331*b* may be disposed in the first and second areas A1 and A2, respectively, on the display panel 2100, for example. Each of the first blocking members 2331*a* and 2331*b* may be spaced apart from the first partition member 2311 and the support member 2320.

The second blocking member 2332 may extend in the first direction DR1, and may be disposed in at least one of the second and third areas A2 and A3 on the display panel 2100. In an embodiment, the second blocking members 2332*a* and 2332*b* may be disposed in the second and third areas A2 and A3, respectively, on the display panel 2100, for example. Each of the second blocking members 2332*a* and 2332*b* may be spaced apart from the second partition member 2312 and the support member 2320.

The third blocking member 2333 may extend in the first direction DR1, and may be disposed in at least one of the third and fourth areas A3 and A4 on the display panel 2100. In an embodiment, the third blocking members 2333*a* and 2333*b* may be disposed in the third and fourth areas A3 and A4, respectively, on the display panel 2100, for example. Each of the third blocking members 2333*a* and 2333*b* may be spaced apart from the third partition member 2313 and the support member 2320.

Figure 15:
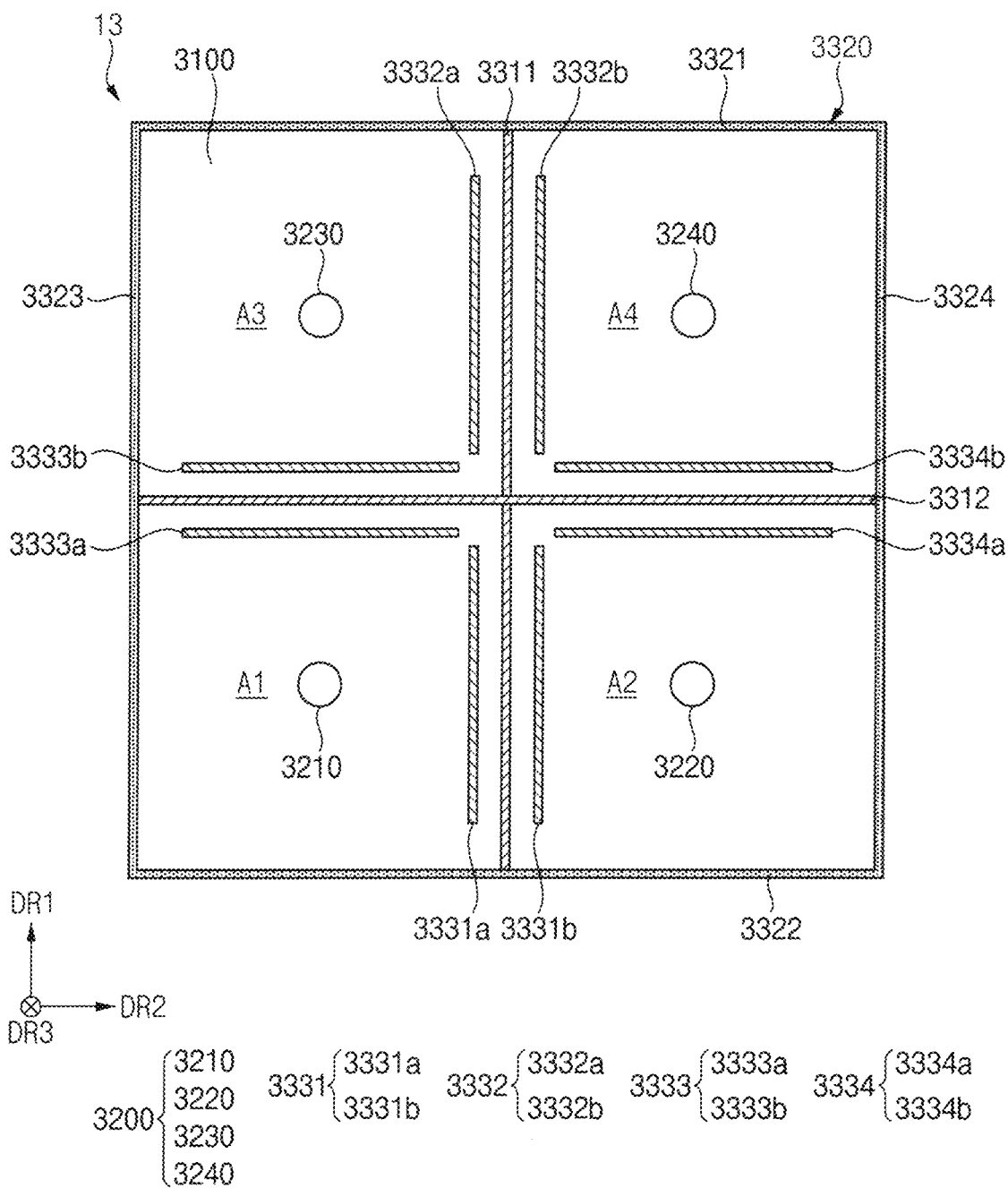
FIG. 15 is a plan view of another embodiment of a display device.

FIG. 15 is a plan view of another embodiment of a display device.

Referring to FIG. 15, a display device 13 in another embodiment may include a display panel 3100, a sound generator 3200, first and second partition members 3311 and 3312, a support member 3320, a first blocking member 3331, a second blocking member 3332, a third blocking member 3333, and a fourth blocking member 3334. The display device 13 may be the substantially same as or similar to the display device 10 described with reference to FIG. 7 except that the display panel 3100 further includes third and fourth areas A3 and A4. Accordingly, detailed descriptions of components which are the substantially same as or similar to components of the display device 10 described with reference to FIG. 7 will be omitted.

The display panel 3100 may include first to fourth areas A1, A2, A3, and A4. The first to fourth areas A1, A2, A3, and A4 may be arranged in two rows and two columns. In an embodiment, as illustrated in FIG. 15, the second area A2 may be disposed in the second direction DR2 from the first area A1, for example. The third area A3 may be disposed in the first direction DR1 from the first area A1. The fourth area A4 may be disposed in the first direction DR1 from the second area A2, and may be disposed in the second direction DR2 from the third area A3.

The sound generator 3200 may be disposed in at least one of the first to fourth areas A1, A2, A3 and A4 on the display panel 1100. In an embodiment, a first sound generator 3210 may be disposed in the first area A1 on the display panel 3100, a second sound generator 3220 may be disposed in the second area A2 on the display panel 3100, a third sound generator 3230 may be disposed in the third area A3 on the display panel 3100, and a fourth sound generator 3240 may be disposed in the fourth area A4 on the display panel 3100, for example. Accordingly, the display device 13 may provide 4.0 channel stereo sound to a user.

The third sound generator 3230 may vibrate the third area A3 of the display panel 3100 based on a third sound signal input from a sound driver. As a third sound wave may be generated by the vibration of the third area A3 of the display panel 3100, a third sound may be output.

The fourth sound generator 3240 may vibrate the fourth area A4 of the display panel 3100 based on a fourth sound signal input from a sound driver. As a fourth sound wave may be generated by the vibration of the fourth area A4 of the display panel 3100, a fourth sound may be output.

The first partition member 3311 may extend in the first direction DR1, and may be continuously disposed at a boundary between the first and second areas A1 and A2 and a boundary between the third and fourth areas A3 and A4 on the display panel 3100. The second partition member 3312 may extend in the second direction DR2, and may be continuously disposed at a boundary between the first and third areas A1 and A3 and a boundary between the second and fourth areas A2 and A4 on the display panel 3100. That is, the display panel 3100 may be divided into first to fourth areas A1, A2, A3, and A4 by the first and second partition members 3311 and 3312.

The support member 3320 may be disposed on the display panel 3100 to entirely surround the first to fourth areas A1, A2, A3, and A4. The support member 3320 may contact each of the first and second partition wall members 3311 and 3312. In an embodiment, as illustrated in FIG. 15, the first partition member 3311 extending in the first direction DR1 may contact first and second sides 3321 and 3322 of the support member 3320. Each of the first and second sides 3321 and 3322 may extend in the second direction DR2, for example. The second partition member 3312 extending in the second direction DR2 may contact third and fourth sides 3323 and 3324 of the support member 3320. Each of the third and fourth sides 3323 and 3324 may extend in the first direction DR1.

The first blocking member 3331 may extend in the first direction DR1, and may be disposed in at least one of the first and second areas A1 and A2 on the display panel 3100. In an embodiment, the first blocking members 3331a and 3331b may be disposed in the first and second areas A1 and A2, respectively, on the display panel 3100, for example. Each of the first blocking members 3331a and 3331b may be spaced apart from the first partition member 3311, the second partition member 3312 and the support member 3320.

The second blocking member 3332 may extend in the first direction DR1, and may be disposed in at least one of the third and fourth areas A3 and A4 on the display panel 3100. In an embodiment, the second blocking members 3332a and 3332b may be disposed in the third and fourth areas A3 and A4, respectively, on the display panel 3100, for example. Each of the second blocking members 3332a and 3332b may be spaced apart from the first partition member 3311, the second partition member 3312 and the support member 3320.

The third blocking member 3333 may extend in the second direction DR2, and may be disposed in at least one of the first and third areas A1 and A3 on the display panel 3100. In an embodiment, the third blocking members 3333a and 3333b may be disposed in the first and third areas A1 and A3, respectively, on the display panel 3100, for example. Each of the third blocking members 3333a and 3333b may be spaced apart from the first partition member 3311, the second partition member 3312 and the support member 3320.

The fourth blocking member 3334 may extend in the second direction DR2, and may be disposed in at least one of the second and fourth areas A2 and A4 on the display panel 3100. In an embodiment, the fourth blocking members 3334a and 3334b may be disposed in the second and fourth areas A2 and A4, respectively, on the display panel 3100, for example. Each of the fourth blocking members 3334a and 3334b may be spaced apart from the first partition member 3311, the second partition member 3312 and the support member 3320.

Although certain embodiments and implementations have been described herein, other embodiments and modifications will be apparent from this description. Accordingly, the invention is not limited to such embodiments, but rather to the broader scope of the appended claims and various obvious modifications and equivalent arrangements as would be apparent to a person of ordinary skill in the art.

What is claimed is:

1. A display device comprising:
a display panel including a first area and a second area;
a sound generator disposed in at least one of the first and second areas on the display panel;
a partition member disposed at a boundary between the first and second areas on the display panel, and extending in a predetermined direction; and
a blocking member disposed in at least one of the first and second areas on the display panel, and spaced apart from the partition member,
wherein a length of the blocking member in the predetermined direction is less than a length of the partition member in the predetermined direction.

2. The display device of claim 1, wherein the blocking member extends in the predetermined direction.

3. The display device of claim 1, wherein the blocking member includes a plurality of blocking patterns spaced apart from each other in the predetermined direction.

4. The display device of claim 1, wherein at least a part of the blocking member is inclined with respect to the partition member.

5. The display device of claim 1, wherein a distance between the blocking member and the partition member is less than a distance between the blocking member and the sound generator.

6. The display device of claim 1, further comprising a support member disposed on the display panel and surrounding the first area and the second area.

7. The display device of claim 6, wherein the blocking member is spaced apart from the support member.

8. The display device of claim 6, wherein the partition member contacts the support member.

9. The display device of claim 6, further comprising an auxiliary blocking member facing the blocking member and symmetric with respect to the sound generator.

10. The display device of claim 9, wherein the auxiliary blocking member is spaced apart from the support member.

11. The display device of claim 1, wherein the display panel further includes a first surface which displays an image and a second surface facing the first surface, and
wherein the sound generator contacts the second surface of the display panel.

12. A display device comprising:
a display panel including a first area, a second area, and a third area disposed between the first and second areas;
a sound generator disposed in at least one of the first to third areas on the display panel;
a first partition member disposed at a boundary between the first and third areas on the display panel;
a second partition member disposed at a boundary between the second and third areas on the display panel;
a first blocking member disposed in at least one of the first and third areas on the display panel, and spaced apart from the first partition member; and
a second blocking member disposed in at least one of the second and third areas on the display panel, and spaced apart from the second partition member.

13. The display device of claim 12, further comprising a support member disposed on the display panel and surrounding the first to third areas.

14. The display device of claim 13, wherein each of the first and second blocking members is spaced apart from the support member.

15. The display device of claim 13, wherein each of the first and second partition members contacts the support member.

16. A display device comprising:
a display panel including a first area, a second area, a third area, and a fourth area arranged in two rows and two columns;
a sound generator disposed in at least one of the first to fourth areas on the display panel;
a first partition member extending in a first direction, disposed at a boundary between the first and second areas on the display panel, and disposed at a boundary between the third and fourth areas on the display panel;
a second partition member extending in a second direction crossing the first direction, disposed at a boundary between the first and third areas on the display panel, and disposed at a boundary between the second and fourth areas on the display panel;
a first blocking member disposed in at least one of the first and second areas on the display panel, and spaced apart from each of the first and second partition members;
a second blocking member disposed in at least one of the third and fourth areas on the display panel, and spaced apart from each of the first and second partition members;
a third blocking member disposed in at least one of the first and third areas on the display panel, and spaced apart from each of the first and second partition members; and
a fourth blocking member disposed in at least one of the second and fourth areas on the display panel, and spaced apart from each of the first and second partition members.

17. The display device of claim 16, further comprising a support member disposed on the display panel and surrounding the first to fourth areas.

18. The display device of claim 17, wherein each of the first to fourth blocking members is spaced apart from the support member.

19. The display device of claim 17, wherein each of the first and second partition members contacts the support member.

* * * * *